United States Patent [19]

Benier

[11] Patent Number: 4,824,356
[45] Date of Patent: Apr. 25, 1989

[54] APPARATUS FOR EXTENDING ROLLS OF DOUGH

[75] Inventor: Johan Benier, Haaren, Netherlands

[73] Assignee: Mobepa B.V., Hertogenbosch, Netherlands

[21] Appl. No.: 50,618

[22] Filed: May 15, 1987

[30] Foreign Application Priority Data

May 16, 1986 [NL] Netherlands ............. 8601257

[51] Int. Cl.$^4$ .............. A21C 3/02; B29C 43/02; B29C 43/46
[52] U.S. Cl. ...................... 425/373; 425/403.1; 426/502
[58] Field of Search ........... 425/373, 363, 383, 367, 425/335, 337, 403.1; 426/502

[56] References Cited

U.S. PATENT DOCUMENTS

| | | | |
|---|---|---|---|
| 2,735,379 | 2/1956 | Stiles | 426/502 |
| 4,113,819 | 9/1978 | Hayashi et al. | 425/373 |
| 4,692,107 | 9/1987 | Morikawa et al. | 425/373 |
| 4,692,110 | 9/1987 | Hayashi | 425/373 |

FOREIGN PATENT DOCUMENTS

| | | |
|---|---|---|
| 0165888 | 12/1985 | European Pat. Off. . |
| 0631558 | 3/1936 | Fed. Rep. of Germany . |
| 2500266 | 2/1981 | France . |
| 8403780 | 7/1986 | Netherlands . |

Primary Examiner—Willard Hoag
Attorney, Agent, or Firm—Brumbaugh, Graves, Donohue & Raymond

[57] ABSTRACT

Apparatus is disclosed for moulding pieces of dough into long thin cylinders. To avoid an irregular shape of the final product and/or a non-uniform interior dough structure, the pieces of dough are rolled over a working surface while pressure is exerted on each half thereof, distributed over a plurality of adjoining transverse zones, by elements of the working surface. Each of the elements is laterally movable substantially in proportion to the local dough migration. For this purpose the invention provides a compression bed for use in an extender over a movable carrier. The side of the compression bed which faces the carrier is constituted by elements symmetrically arranged relatively to the longitudinal median plane of the compression bed and journalled for lateral movement.

6 Claims, 3 Drawing Sheets

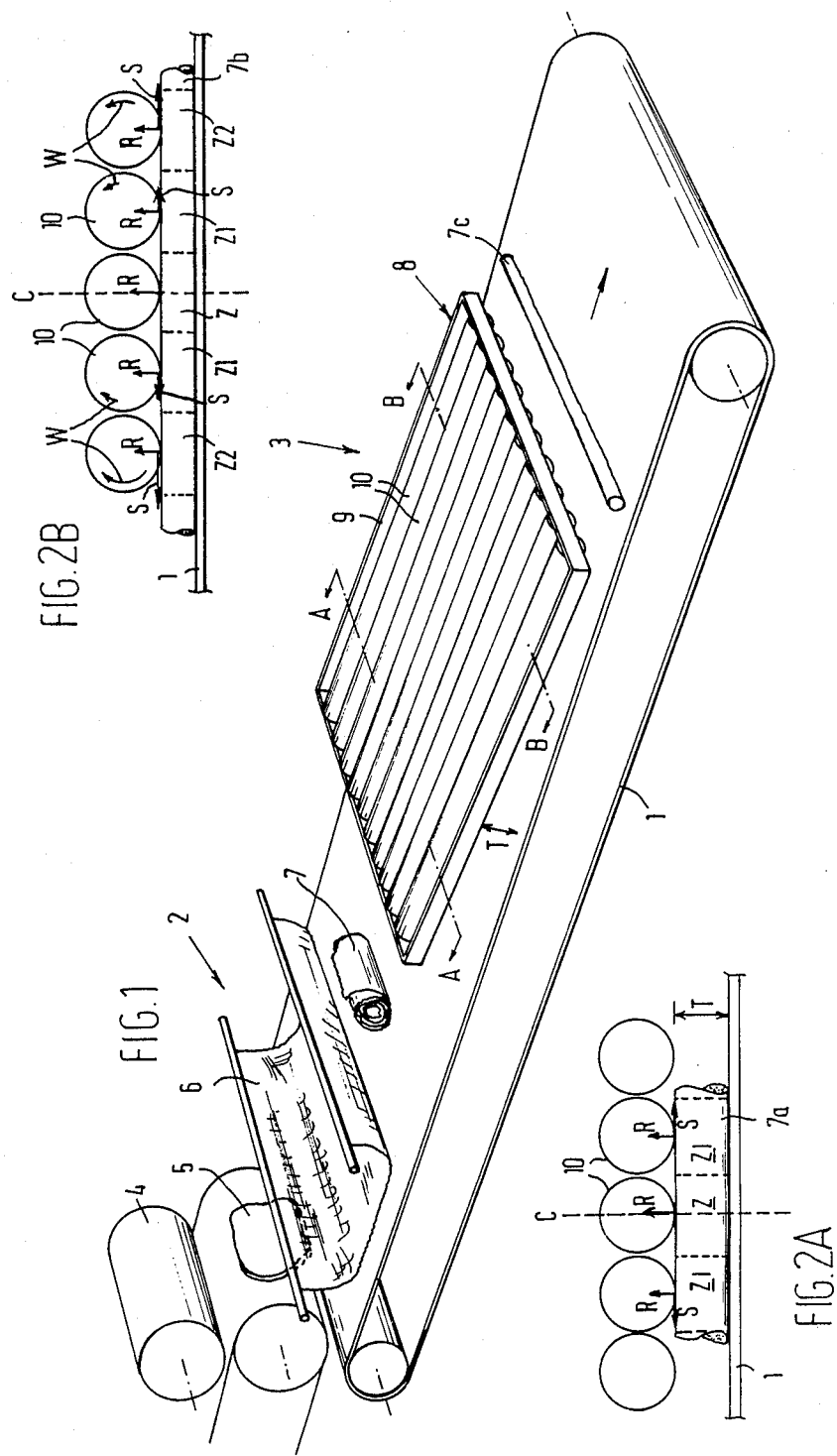

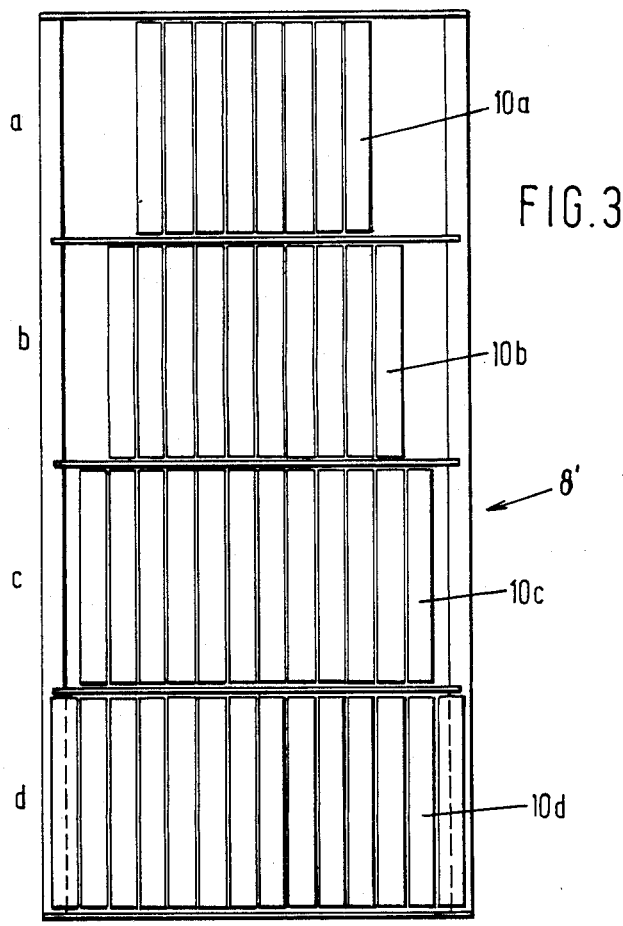

APPARATUS FOR EXTENDING ROLLS OF DOUGH

This invention relates to extending dough, that is to say, rolling a piece of dough into a long thin cylinder, which piece of dough may have been premoulded into a shorter, thicker cylinder, for example, a dough ball first sheeted (i.e. flattened into a thick sheet) in a moulder and then curled. Such a relatively short and thick spiral-shaped curled dough cylinder can be rolled into a longer, thinner cylinder by an extending operation, for example, for making long loaves, from which round toasted slices can be made.

Extending a piece of dough is in principle effected in a space between two converging surfaces, in which the piece of dough is forced to roll towards the narrower end of the tapering surfaces by the relative movement of the two surfaces. During rolling, the piece of dough is reduced in diameter and extended in length laterally, that is to say, transversely to the direction of rolling.

All extending techniques hitherto used, which are distinguished from each other in differently formed and/or differently driven surfaces, have the disadvantage that the dough is insufficiently spared, i.e. the dough is given insufficient opportunity of freely moving sideways from the middle of the piece of dough during rolling, i.e., transversely to the direction of rolling. Such lateral dough migrations, which are inherent in the rolling dough cylinder becoming longer and thinner, encounter increasingly counteracting frictional forces from the surface which moves relatively more slowly or is stationary. These counteracting frictional forces have a destructive effect on the dough surface and give rise to a non-uniform internal dough structure.

The oldest known extending technique is that in which the piece of dough is carried by a conveyor belt and is forced to roll under a flat compression plate disposed above the conveyor belt and inclined in the direction of movement of the conveyor belt. In this arrangement the friction experienced by the laterally displacing dough is so high that, to limit this friction, a long extending path must be used, which, however, has the disadvantage that owing to the prolonged rolling treatment the dough structure deteriorates.

In order to make for a shorter rolling path in this basic technique, it has been proposed to form the lower surface of the compression plate with grooves and/or ridges symmetrically diverging in the direction of movement of the conveyor belt to impart a given lateral elongation to the dough piece within a predetermined path of travel. To avoid, in this arrangement, that dough sticks in the grooves, it has been proposed in DE-PS-No. 631,558 to provide freely rotating rollers, journalled in the compression plate transversely to the compression grooves, i.e., with the roller shafts converging in the direction of movement of the conveyor belt.

In another proposal, disclosed in DAS No. 21,46,554, the compression plate has been replaced by two symmetrically juxtaposed endless conveyor belts oppositely driven transversely to the direction of movement of the carrying conveyor belt.

All these prior techniques disregard the fact that, in a cylinder which is uniformly extended in lateral direction the dough migration from the middle to the sides is not uniform but progressive, that is to say, as a transverse zone of the dough cylinder is further from the middle, more dough must be displaced from this zone, i.e., not only dough from this zone itself must be displaced outwardly, but also dough from zones located more centrally and migrated to the zone in question. Indeed, in each extending technique which disregards this effect, and is based on a constant lateral guidance and/or exercise of force throughout the entire length of both dough cylinder halves, the dough will tend to congest towards the ends, which leads to an irregular shape of the final product and/or a non-uniform interior dough structure.

It is an object of the present invention to avoid the above drawbacks of the prior art dough rolling techniques.

In one aspect, therefore, the present invention provides a method of moulding a piece dough into a long thin cylinder, which comprises rolling the piece of dough over a working surface while exerting pressure thereon, characterized in that on each half of the dough piece, and distributed over a plurality of adjoining transverse zones, pressure is exerted by elements of the working surface, each of said elements being laterally movable substantially in proportion to the local dough migration. In this manner any dough congestion as a result of friction is avoided.

By allowing the dough in each transverse zone, in accordance with this invention, to carry along the pressure exerting elements with which it is in contact as the dough is migrating from the middle in the direction of its lateral ends, the movement of each element is at all times in agreement with the local dough migration. The friction experienced by the dough at the pressure-exerting elements is low an-d mainly restricted to the friction required to allow the elements to be driven by the dough.

In order that friction may be avoided altogether, according to one feature of the present invention, the pressure-exerting elements are driven for lateral movement in a differentiated manner depending on the calculated local dough migration.

Optimum differentiation is that in which the pressure-exerting elements are driven to an increasing extent from the middle of the rolling zone to the lateral ends and/or from the beginning of the rolling zone to the end thereof.

For carrying the method into effect, the present invention provides a compression bed for use in an extender, in which the compression bed can be mounted in an adjustable manner over a movable carrier, characterized in that the side of the compression bed which, in the mounted condition, faces the carrier is only constituted by elements journalled symmetrically relatively to the longitudinal median plane of the compression bed for lateral movement. In this arrangement, transverse zones of a dough cylinder which is being laterally elongated will, during its movement under the compression bed, come into contact with different elements which each can be caused to move laterally along with the dough in a degree depending on the amount of the component of elongation in the dough rolling zone concerned.

When, in accordance with this invention, the compression bed is longitudinally divided into successive sections each comprising section elements transversely movable independently of elements in other sections, it is possible to increase the capacity of an extender equipped with such a compression bed. In fact, as soon as a roll of dough has left a section and is in the space between the next section and the subjacent carrier, a fresh roll of dough can be supplied and thus a plurality of rolls of dough can be extended simultaneously without specific displacements of dough in one roll and corresponding movements of the elements having any effect on the elements in other sections and hence on displacements of dough in other rolls of dough.

In a first embodiment of the compression bed according to this invention, the movable elements are longitudinally oriented rollers each mounted for rotation about its axis. Such freely-journalled side-by-side rollers can be caused to rotate by a roll of dough moving under them and this each to an extent depending on the local and instantaneous dough displacing component, so that dough migrations towards the lateral ends of a dough cylinder being elongated can take place with a minimum of friction. The rollers can extend throughout the entire length of the compression bed, but preferably the compression bed is composed of longitudinally successive sections of series of shorter rollers.

Alternatively, the rollers of the compression bed or of one or more sections of the compression bed are drivable in a differentiated manner.

In a variant embodiment of the invention, the freely movable elements are longitudinally oriented bars having a curved cross-sectional profile at least at the underside facing the carrier in the mounted condition of the compression bed, said elements being each individually pivotable about pivot axes located above the elements. In this arrangement, too, laterally migrating dough in a dough cylinder rolling under the bars and thereby being laterally elongated can carry along the bars with which it comes into contact in a lateral pivoting movement, with each bar being displaced parallel to itself and retaining its orientation relative to the subjacent carrier. Such pivoting bars can also extend throughout the entire length of the compression bed or be provided section-wise. The bars may be driven in a differentiated pivoting movement.

It is clear that the invention is not limited to the embodiments which will be described herein by way of example and that various variants are possible without departing from the scope of the invention. The essential point is that the differentiated, in particular the progressive dough migration from the middle of a dough roll to its lateral ends during the extending treatment is taken into account and this by providing a compression bed to be mounted above a movable carrier, which compression bed comprises a plurality of elements which, while exerting pressure on the dough in the direction of the carrier move laterally along with the dough in some way in such a manner that no frictional forces causing dough congestion are generated between the dough and these elements.

BRIEF DESCRIPTION OF THE DRAWINGS

Some embodiments of the extender with compression beds according to the present invention will now be described, by way of example, with reference to the accompanying drawings.

In said drawings,

FIG. 1 is a diagrammatic perspective view of the extender;

FIGS. 2A and 2B are cross-sectional views of the compression bed according to the arrows A—A and B—B in FIG. 1;

FIG. 3 shows a variant embodiment of the compression bed of FIG. 1;

Figure 4:
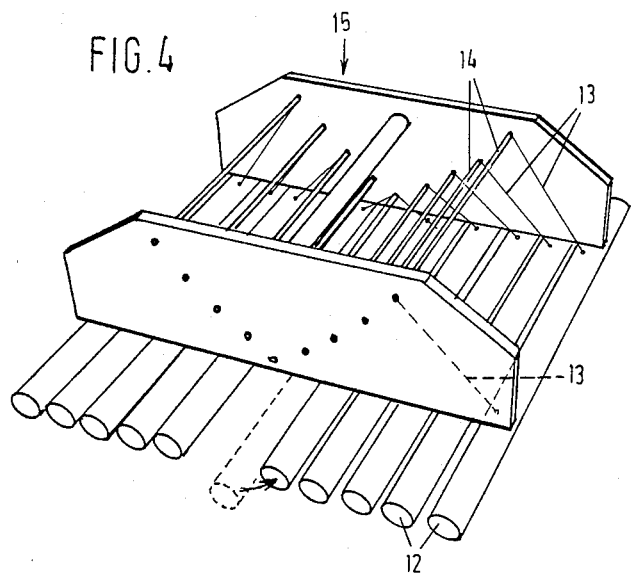
FIG. 4 diagrammatically shows a compression bed element comprising individually pivotable bars.

As illustrated in the drawings, in particular FIG. 1, a carrier in the form of an endless conveyor belt 1 extends from a moulder 2 to an extender 3. The moulder 2 comprises sheeting rollers 4 which transform pieces of dough, in particular dough balls into flat disks 5 which are drawn by carrier 1 under a net 6 and thereby are curled into short thick cylinders 7 without the exercise of pressure. These are drawn by carrier 1 in the extender under a compression bed 8 mounted above the carrier with an adjustable slope in the direction of transport of carrier 1 to form a tapering space T therewith. In this space, dough cylinder 7 is drawn by the carrier towards the narrow end, while the cylinder 7 rolls against compression bed 8. As a result of the radial pressure to which it is subjected, the cylinder 7 becomes increasingly thinner with dough migrating from the middle to both ends. The resulting product is indicated at 7c in FIG. 1. Two intermediate phases of this transformation of dough cylinder 7 to the longer and thinner dough cylinder 7c are shown in FIG. 2A and 2B, which will be described in more detail hereinafter.

In the embodiment of FIG. 1, compression bed 8 comprises a frame 9 in which rollers 10 are disposed immediately next to each other and journalled for free rotation about their axes.

As will be seen from a comparison of FIG. 2A with FIG. 2B dough cylinder 7 comes into contact with more and more rollers 10 as it advances through space T. During this procedure, the piece of dough experiences a radial pressure which gives rise to vertical reaction forces R. Owing to lateral dough migration from the middle, the dough also exercises a lateral force S on rollers 10, which increases as the point of compression is further from the middle C. In fact, if a dough cylinder 7a, b is divided into a plurality of transverse zones Z then, as the middle zone Z will become thinner, an amount of dough will be displaced to the adjoining zones Z1. From zones Z1, in principle, not only must the same quantity of dough be displaced to the adjoining zones Z2, but in addition, an amount corresponding to the quantity received from the central zone Z, and so on.

In practice, this outwardly increasing displacement of dough results in an increasing lateral force S being exercised on the respective rollers 10, as a result of which rollers 10 are rotated about their axes to an increasing extent, as shown by arrows W.

When the compression bed according to the invention is used, no frictional forces opposing a free lateral deformation of the piece of dough 7–7c will be exercised thereon anywhere.

In the variant embodiment of compression bed 8 and shown in FIG. 3, compression bed 8' comprises a frame 9 divided into four sections (a) . . . (d). A plurality of rollers 10a–10d, oriented in longitudinal direction, is journalled for free rotation in each section. As soon as a dough cylinder moving under compression bed 8' has left section (a) and rolls further under section (b), a fresh roll of dough can be passed under section (a).

In each section, rollers 10a, . . . 10d exercise pressure on a passing dough roll in the same low-friction manner as under the compression bed 8 of FIG. 1. The capacity of an extender with a compression bed 8', however, is higher than that of a device employing a compression bed 8.

The compression bed construction shown in FIG. 4, in which the element shown forms itself the compression bed, or a section thereof, differs from compression bed 8 and from compression bed 8' in that the rollers or bars 12 are not journalled for free rotation about their axes, as are rollers 10, 10a–10d, but are pivotally suspended through arms 13 from pivoting shafts 14 extending in spaced parallel relationship to bars 12 in a frame 15 that can be mounted in an adjustable manner above a movable carrier 1 (FIG. 1). Each bar can pivot from the position shown dotted in FIG. 1 about its own axis to the position shown in solid lines under the influence of the lateral displacement of a transverse zone Z of a dough roll 7 that is in contact with the bar in question.

Figure 5:
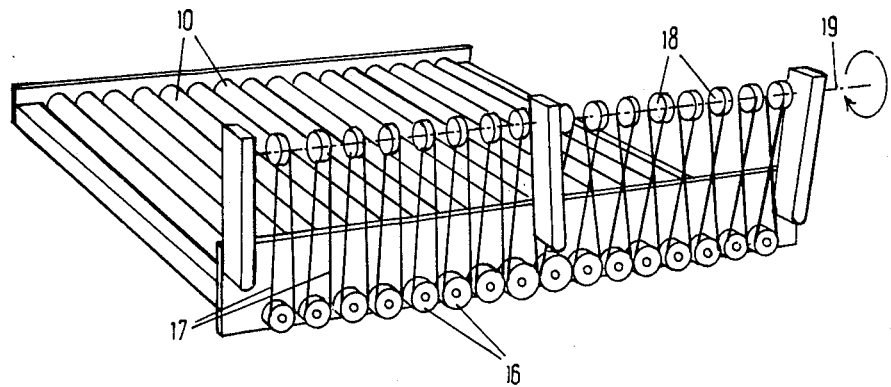
FIG. 5 is a diagrammatic perspective view of a compression bed similar to FIG. 1, and provided with rollers driven in a differentiated manner.

FIG. 5 shows an embodiment of the compression bed of FIG. 1 or FIG. 3 in which at least some of the compression rollers 10 are driven through draggers 16, mounted at one of the roller ends, ropes 17 and driving disks 18 mounted on a common drive shaft 19. Differentiation can be effected by varying the diameter of the draggers and/or of the driving disks 18. In the embodiment shown, the diameter of the draggers 16 decreases from the middle to the lateral ends, so that rollers 10 are driven to increasing extent from the middle laterally. When driven rollers 10 are used in a compression bed divided into successive sections, as shown in FIG. 3, the drive can be limited to the last section d or the last sections c and d.

I claim:

1. An apparatus for compressing and extending dough comprising an endless conveyor, a vertically adjustable compression bed mounted in such a way so as to define the space between the compression bed and endless conveyor, the space being larger at the entrance to the compression bed than at the exit of the compression bed, the compression bed further comprising elements journaled for rotation about axes generally perpendicular to the rotational axes of the means mounting said conveyor.

2. An apparatus as described in claim 1, wherein the compression bed is divided into successive sections, along the length thereof, each section further comprising elements transversely movable of the conveyor independently of elements in other sections.

3. An apparatus as described in claim 1 or 2, wherein the independently movable elements are rollers oriented longitudinally of the conveyor and rotatable about their own axes.

4. An apparatus as described in claim 1 or 2, wherein the movable elements are bars longitudinally oriented relative the conveyor and comprising a curved cross-sectional profile on at least the underside facing the conveyor, each movable element being longitudinally pivotable about and located above the element.

5. An apparatus as described in claim 1 or 2, wherein the compression bed elements are mounted for free movement about their respective axes of rotation or pivotation.

6. An apparatus as described in claim 1 or 2, wherein the compression bed elements are drivable in a differentiated manner.

* * * * *